UNITED STATES PATENT OFFICE.

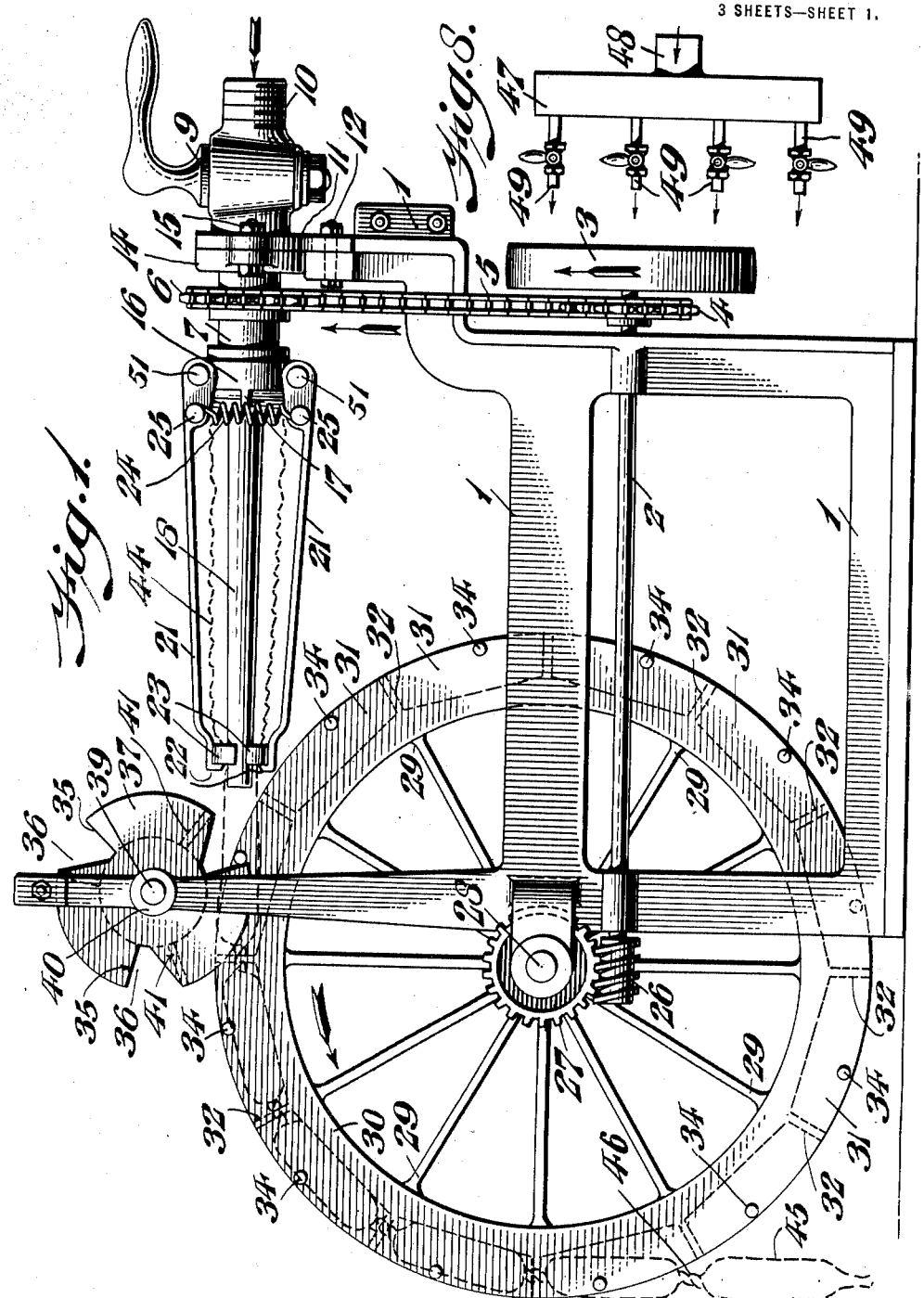

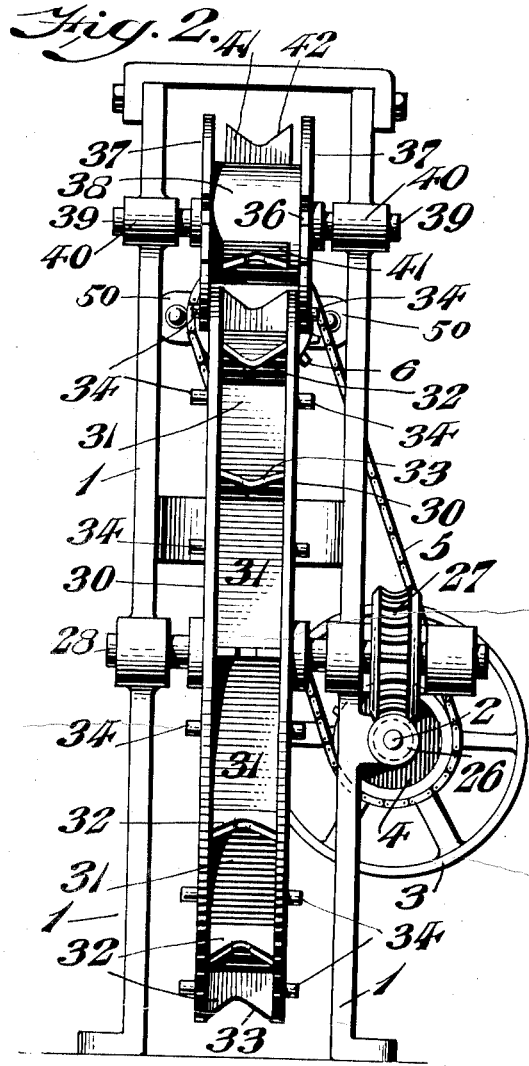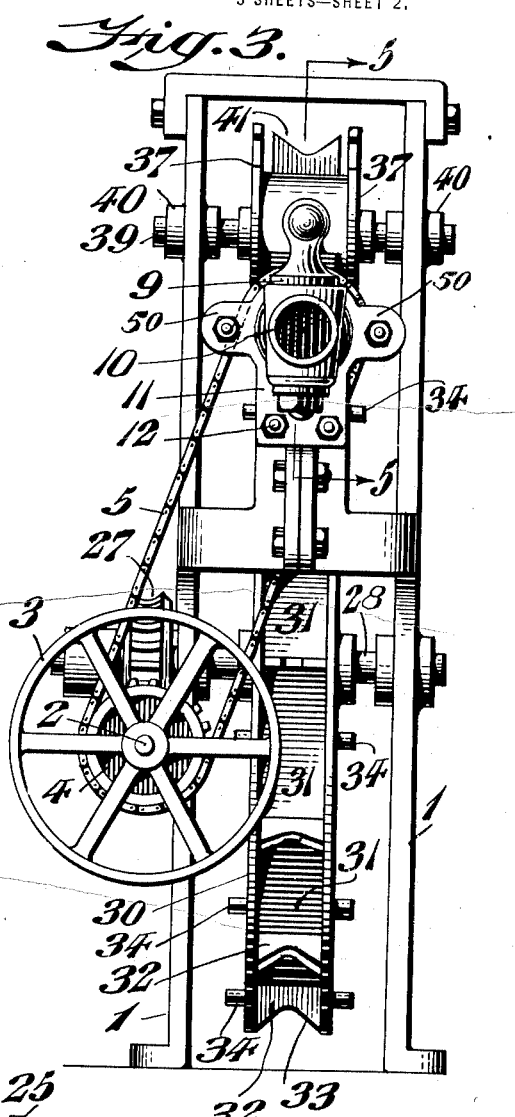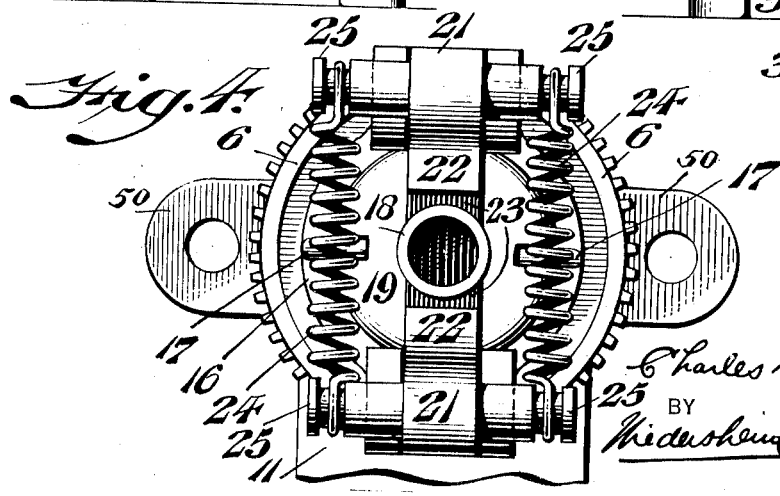

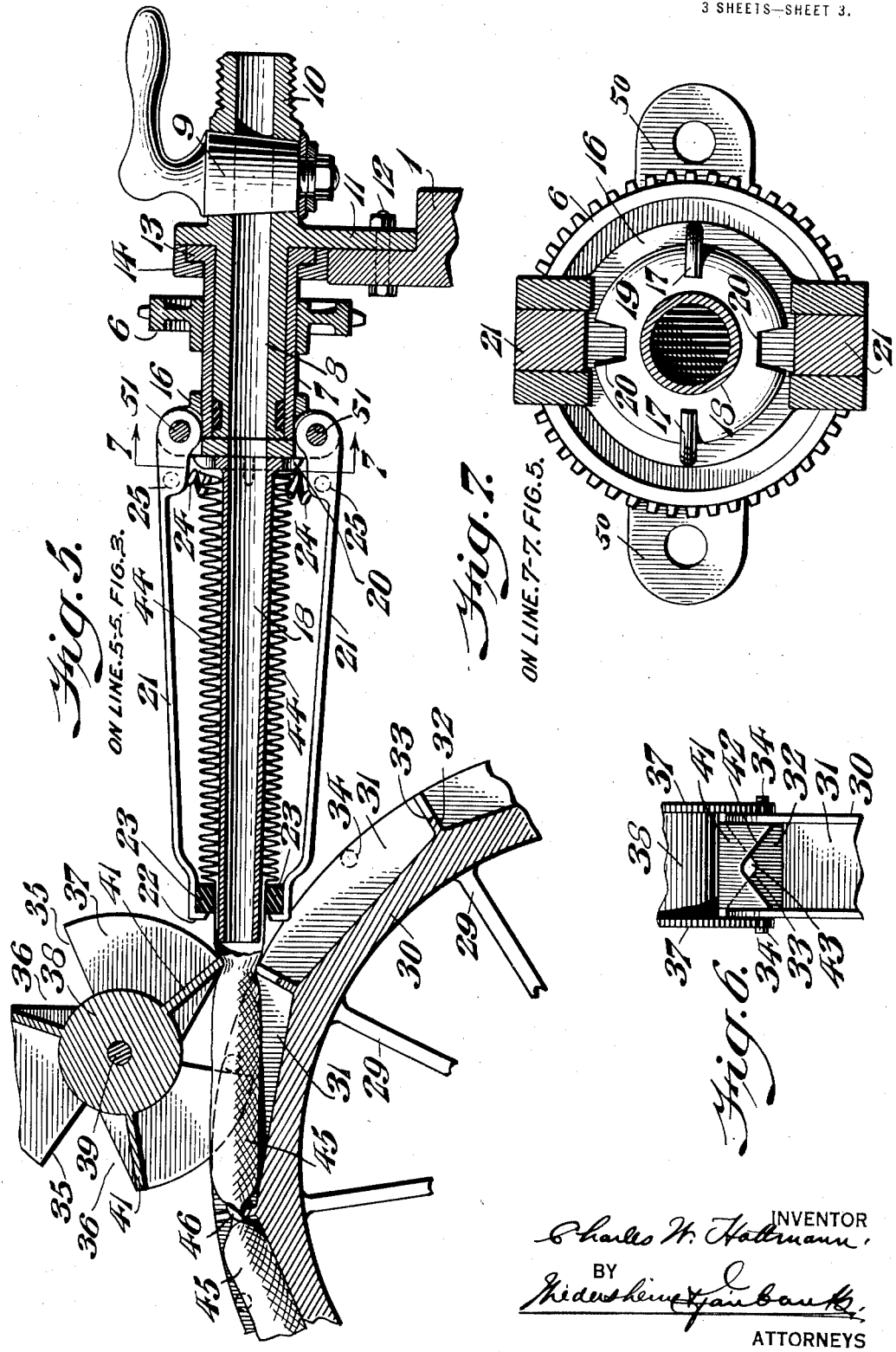

CHARLES W. HOTTMANN, OF PHILADELPHIA, PENNSYLVANIA.

SAUSAGE-LINKING MACHINE.

1,366,183.     Specification of Letters Patent.     Patented Jan. 18, 1921.

Application filed June 1, 1920. Serial No. 385,615.

*To all whom it may concern:*

Be it known that I, CHARLES W. HOTTMANN, a citizen of the United States, residing in the city and county of Philadelphia, State of Pennsylvania, have invented a new and useful Sausage-Linking Machine, of which the following is a specification.

My present invention comprehends in its broad and generic scope a novel construction and arrangement of a sausage linking machine wherein the sausages are linked automatically during the stuffing operation.

It further comprehends a novel construction of a machine for linking sausages wherein the sausage meat is continually fed into the casing while the unstuffed portion of the casing is being continuously revolved in the same direction, provision being made for retaining a stuffed link in a fixed position during the rotation of the unstuffed portion of the casing, whereby the linking of the casing is effected.

It further comprehends a novel construction and arrangement of a stuffing spout, novel means for retaining a casing thereon and at the same time permitting its longitudinal movement during the stuffing operation, novel means for holding the links, novel link forming devices and novel means for occasioning the movement of the different parts of the machine.

Other novel features of construction and advantage will hereinafter more fully appear in the detailed description of my invention.

For the purpose of illustrating my invention, I have shown in the accompanying drawings a typical embodiment thereof which is at present preferred by me, since this embodiment will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents, in side elevation, a sausage linking machine embodying my invention.

Fig. 2 represents a front elevation of the machine.

Fig. 3 represents a rear elevation of the machine.

Fig. 4 represents, in front elevation, the stuffing spout and certain of its adjuncts.

Fig. 5 represents a section on line 5—5 of Fig. 3.

Fig. 6 represents, in front elevation, certain portions of the linking mechanism.

Fig. 7 represents a section on line 7—7 of Fig. 5. Fig. 8 represents a plan view of a manifold employed when a plurality of linking machines are connected to a single stuffing machine.

Similar numerals of reference indicate corresponding parts.

Referring to the drawings.

1 designates the frame of a sausage linking machine embodying my invention, it being understood that the contour and construction of the same may vary widely in practice. The frame 1 has journaled in it the main driving shaft 2 which carries a pulley 3 which is adapted to be driven by any desired source of power. The shaft 2 also carries a sprocket wheel 4 around which passes a sprocket chain 5 which latter also passes around a sprocket wheel 6 which is fixed in any desired manner to a sleeve 7 which is rotatably mounted on a discharge conduit 8, the passage through which is controlled by the manually actuated valve 9. The inner end of the conduit 8 is adapted to be connected to the sausage stuffing machine proper and for purposes of illustration, I have shown such end exteriorly threaded to receive any desired type of coupling nut, flexible hose or the like in order to connect the conduit 8 to the discharge from the stuffing machine. The conduit 8 is provided with a flange 11 which is secured to the frame 1 by means of fastening devices 12. The sleeve 7 is provided at one end with a flange 13 which extends outwardly and is journaled in the flanged collar 14 which is secured to the flange 11 by means of fastening devices 15, see more particularly Fig. 1.

The sleeve 7 at its forward end is provided with a head 16 which consists of a collar fixed in any desired manner on the forward end of the tube 7 and provided on its forward face with a plurality of hooks 17. 18 designates the stuffing spout which is provided at its rear end with a flange 50 having the recesses 20 opening through its periphery in order that the stuffing spout or tube will be readily detachable when desired. The head 16 is provided with the apertured ears 50 which receive the pins 51 on which are mounted the pressure arms 21, the forward ends of which are laterally deflected, as at 22, in order to secure in position the pressure members 23 which may be formed of any desired material but in practice are preferably formed of rubber.

The arms 21 are moved toward the stuffing spout 18 owing to the provision of one or more springs 24 one end of which is connected to a rod 25 carried by the upper arm 21 and the other end of which is connected to a similar rod 25 carried by the lower arm. It will be understood from Fig. 4 that I preferably employ two of these springs 24.

Referring now more particularly to Figs. 1 and 2, the driving shaft 2 is provided with a worm 26 which meshes with a worm gear 27 carried by a shaft 28 which is journaled in the frame 1 of the machine.

The shaft 28 has fixed to it in any desired manner a skeleton wheel 29, the rim 30 of which is recessed to form a continuous series of pockets 31 separated from each other by means of the diaphragms or partitions 32 which are directed preferably radially of the wheel and have the V-shaped cut 33 so that the upper wall of such diaphragms or partitions 32 diverge outwardly toward the side wall of the rim of the wheel. The side wall of the rim of the wheel is provided with laterally extending pins or lugs 34 which travel in the path of the walls 35 formed by the cut away portions 36 in the disk 37, said disk extending from a hub 38 fixed on a shaft 39 which latter is journaled in trunnions 40 in the frame 1 of the machine. The hub 38 has extending outwardly therefrom the blades 41 which are provided with substantially V-shaped cuts 42 so that when the blades such as 32 and 41 come into the relative position seen in Fig. 6, the restricted aperture 43 is formed. It will of course be understood that I do not desire to be limited to any special contour of the aperture 43, since all that it is necessary to have is a restricted opening to confine the casing 44 during the linking operation.

The disk 37, blades 41 and their adjuncts can also be dispensed with in practice although in many cases arising in practice, I prefer to employ such portion of the linking mechanism.

45 designates the links of sausage and 46 designates the twisted portion of the casing between the links.

The stuffing spout 18 is preferably of such height with respect to the wheel 29, which in its broad aspects is a conveyer, that during the stuffing operation a link or length of casing which is to be linked is supported as seen in Fig. 5.

The operation of my novel construction of automatic sausage linking machine will now be readily apparent to those skilled in the art to which this invention appertains and is as follows:—

Assuming now that the inlet end of the conduit 8 has been operatively connected to the discharge opening of the sausage stuffing machine and that the parts are constructed and arranged as shown in the drawings, the casing to be stuffed is first assembled on a stuffing spout 18, as shown in Figs. 1 and 5. These casings are ordinarily forty or more feet in length and must be carefully handled as they are liable to become torn unless they are carefully handled. In order to save time, I preferably assemble the casings on a number of stuffing spouts 18, so that a stuffing spout may be readily secured in position and also may be readily removed and another stuffing spout assembled in order to increase the capacity of the machine. In assembling a stuffing spout, the recesses 20 in the flange 19 are brought into register with the hooks 17 and the stuffing spout is then given a partial rotation so that it will be locked with respect to the rotatable sleeve 7, as will be understood by reference to Figs. 5 and 7.

The forward free end of the casing is drawn forwardly under the pressure members 23 and is moved forwardly until it is compressed and held by juxtaposed blades 32 and 41 or, if desired, the forward free end of the casing may be tied by means of a cord or its equivalent. The machine is now ready to be operated and the driving shaft 2 is driven in any desired manner. The valve 9 is opened and the sausage is fed from the stuffing machine through the conduit 8 into and through the stuffing spout 18 and into the casing 44. The conveyer formed by the wheel 29 and its adjuncts is rotated in the direction of the arrow seen in Fig. 1 and the sleeve 7 is operatively connected with the driving shaft 2, in order that it will be rotated in the direction of the arrow seen at the right hand portion of Fig. 1. This causes the stuffing spout 18 to be continuously rotated in the same direction during the stuffing operation.

As the conveyer rotates the pins 34 contact successively with the walls 35 and cause a partial rotation of the blades 41 so that the casing which has been filled with sausage is compressed at predetermined points in its length owing to the coming together of the blades 41 and 32 which serve to hold the casing at this time at the end of a length of sausage and since the casing 44 on the stuffing spout 18 is revolving, the links 45 will be separated by a twisted portion 46, the twist being always in the same direction.

The links thus formed are received in the pockets 31 and the chain of links is automatically delivered from the conveyer as soon as completed, as will be apparent.

As soon as one casing has been stuffed the stuffing spout 18 is removed and another stuffing spout with the casing in position on it is secured in position and the cycle of operation above described is repeated. It will of course be understood that it is unnecessary to employ a plurality of stuffing spouts 18 and that simply one of these spouts can be employed; in which case as soon as one casing has been stuffed, the operator opens the spring arms 21 and pushes a new casing into position on the stuffing spout and then releases the spring arms 21 so that the pressure members 23 carried thereby will exert a yielding pressure against the casing at the forward end of the stuffing spout.

I preferably employ not only the conveyer, such as 29, but also the blades 41 and their adjuncts, but it is not necessary in all cases to employ the blades 41 and their adjuncts and the parts 34 to 41 may be dispensed with if desired. It will be clear that if these parts are omitted, the casing will be held in the cut out portion at the top of the blades 32 sufficiently to hold a stuffed link during the linking operation.

I have found that advantageous results are obtainable by employing a blade 32 as illustrated with a substantially V-shaped cut-away portion but it will be apparent that the upper face of the blade 32 or the lower face of the blade 41 may assume many varied forms and accomplish the result intended and I do not therefore desire to be limited to constructing such blades of any specific form.

The movement of the conveyer causes the casing to be withdrawn from the stuffing spout as rapidly as the stuffing and linking operation is effected and there is no likelihood of breaking or tearing the casing.

It will be apparent that the conveyer which may include the rotatable conveyer 29 and its adjuncts as well as the rotatable blades 41 causes an accurate feed of the casing from the stuffing spout and the blades 32 together with the blades 41, if the latter are employed, define the lengths of the links so that the different links will be of uniform lengths.

The sausage casing as is well known is comparatively thin and is easily torn or broken and in the machines heretofore employed for the linking of sausage, considerable difficulty and annoyance and expense has arisen owing to the tearing of the casing.

In accordance with my present invention this difficulty is overcome since a comparatively slow feed of revolution is imparted to the stuffing spout in one direction, so that the twist in the casing at the end of a link is always in the same direction and the likelihood of a casing becoming torn is in practically every case eliminated unless the skins from which the casings are made are defective.

In Fig. 8, I have illustrated a manifold 47 having an inlet 48 adapted to be connected to the discharge outlet from the stuffing machine and provided with a plurality of valve controlled discharge conduits 49 each of which is adapted to be connected to its respective conduit 8, it being understood that in many cases arising in practice a plurality of linking mechanisms as herein shown can be employed with a single stuffing machine.

It will be apparent that I have devised a new and useful sausage linking machine which embodies the features of advantage enumerated as desirable in the statement of the invention and the above description, and while I have, in the present instance, shown and described a preferred embodiment thereof which will give in practice satisfactory and reliable results, it is to be understood that said embodiment is susceptible of modification in various particulars without departing from the spirit or scope of the invention or sacrificing any of its advantages.

Having thus described my invention, what I claim as new and desire to secure by Letters Patent, is—

1. An automatic sausage linking machine, comprising means to continuously feed material into a casing, and means to automatically link the casing during the feeding operation by turning the casing in the same direction.

2. An automatic sausage linking machine, comprising rotatable means to continuously feed material into a casing, and means to automatically link the casing during the feeding operation by turning the casing in the same direction.

3. An automatic sausage linking machine, comprising a spout to receive a casing to be stuffed, means to continuously revolve said spout in the same direction, and a conveyer having means to engage the casing at predetermined intervals to hold it during the rotation of said spout, whereby the linking of the casing is effected.

4. An automatic sausage linking machine, comprising a rotatable spout, casing retaining means resiliently moved toward said spout, means to continuously revolve said spout in the same direction, a conveyer movable in unison with said spout and having means to define the length of a segment of the casing and to hold a segment of the filled casing during the revolution of said spout, whereby the linking operation is effected.

5. An automatic sausage linking machine, comprising casing filling means and a conveyer having spaced blades between which a segment of the filled casing is supported, said blades being adapted to restrict the diameter of the casing, and means to continuously revolve the casing.

6. An automatic sausage linking machine, comprising a rotatable spout having means to retain a casing on it, a rotatable conveyer having recesses in its periphery, and spaced blades in said recesses, the upper face of said blades being adapted to engage a filled casing during the rotation of said spout.

7. An automatic sausage linking machine, comprising a rotatable spout having means to retain a casing on it, a rotatable conveyer having recesses in its periphery, spaced blades in said recesses, and blades actuated by said conveyer to bring them into proximity with the conveyer blades to form restricted openings, the walls of which engage the casing to hold it during the revolution of said spout and thereby effect the automatic linking of the casing.

8. An automatic sausage linking machine, comprising a rotatable spout, means to continuously rotate it, a rotatable conveyer having peripheral recesses separated from each other by blades, pins on said conveyer, a rotatable member having means in the path of said pins, whereby said member and conveyer rotate together, and blades carried by said member and coöperating with the blades of said conveyer to engage the casing after a predetermined segment of it has been filled.

9. An automatic sausage linking machine, comprising a valve controlled conduit adapted to be connected to the stuffing machine, a rotatable spout communicating with said conduit, a conveyer, and means to continuously rotate said conveyer and said spout, said conveyer having means to hold a predetermined length of the filled casing during the rotation of said spout, whereby the linking operation is automatically effected during the stuffing of the casing.

10. An automatic sausage linking machine, comprising a rotatable spout to receive the casing, means to continuously feed material to said spout, a tension device at the forward end of said spout to resiliently clamp the casing to it, a conveyer adapted to effect the feed of the casing from said spout and having means to engage predetermined lengths of the casing to restrict their revolution during the revolution of said spout in order to effect the automatic linking of the casing, and means to actuate said conveyer.

CHARLES W. HOTTMANN.

Witnesses:
H. S. FAIRBANKS,
F. A. NEWTON.